Oct. 21, 1958  E. J. BRUINGTON  2,856,723
FISHING LINE SINKER
Filed Dec. 14, 1954

Eldon J. Bruington
INVENTOR
BY
ATTORNEYS.

United States Patent Office 2,856,723
Patented Oct. 21, 1958

2,856,723

FISHING LINE SINKER

Eldon J. Bruington, Onamia, Minn.

Application December 14, 1954, Serial No. 475,127

1 Claim. (Cl. 43—43.13)

This invention relates to a lead sinker construction, the primary object of the invention being to provide a sinker which is so shaped that it will prevent the fishing line and hook, with which the sinker is used, from twisting, owing to the location of the bulk of the weight of the sinker.

Another important object of the invention is to provide a sinker that will maintain the line straight in its travel through the water, eliminating sidewise movement of the bait or lure attached to the line, which frequently is the cause of fishing lines used in fishing in the same immediate area becoming tangled and fouled.

Still another object of the invention is to provide a sinker which will also, by its direct line of travel, eliminate twisting of the lines caused by the action of spinning lures whirling during fishing.

A further object of the invention is to provide a sinker which is so weighted that the lower edge thereof will rest on the bottom of the body of water and cause the sinker to ride over irregularities on the bottom of the body of water, obviating the possibility of the weight hanging in foreign matter which may lie on the bottom of the body of water.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing.

Figure 1:
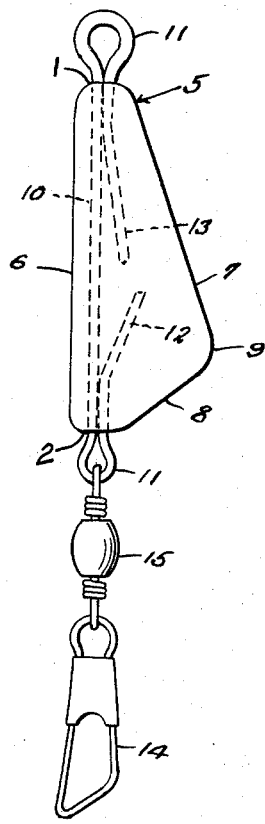
Figure 1 is a side elevational view of a sinker, constructed in accordance with the invention.
Figure 2:
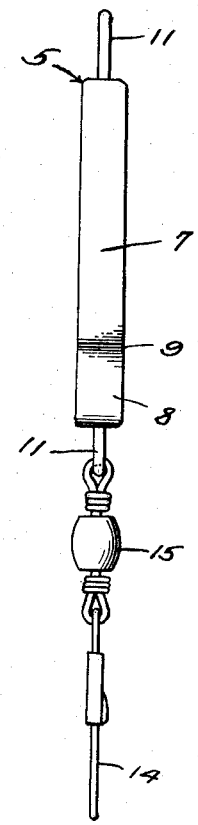
Figure 2 is an edge elevational view thereof.

Referring to the drawing in detail, the sinker comprises a body indicated generally by the reference character 5, the body having a first straight upper edge 6 and a second downwardly and rearwardly inclined edge 7 disposed at an acute angle with respect to the edge 6.

The inclined edge 7 extends to a point adjacent to one end of the body, where it merges into a third inclined edge 8 providing a rounded enlargement 9. The first and second sides are joined by a fourth flat side 1 and the first and third sides are joined by a fifth flat side 2.

In forming the sinker, the lead material of which the body is formed is molded around a length of wire having an elongated straight bar portion 10 disposed parallel with the first side 6 and which has its ends extended inwardly providing closed loops or eyes 11, the short bars 12 and 13 of the wire being extended laterally of the straight bar and embedded in the lead to anchor the wire within the body 5.

The eyes 11 are extended beyond the ends of the body 5, and are disposed in parallel close proximity with the straight upper edge 6 of the sinker, so that the bulk of the weight hangs downwardly with the result that the line which is connected with an eye 11 at one end of the sinker will be maintained in a straight line on its travel through the water. Because of the straight movement of the line, it will be seen that any possibility of the line tangling with fishing lines being used in the immediate vicinity of the line equipped with a sinker constructed in accordance with the invention, will be prevented. Such tangling frequently occurs when fishing lines are equipped with the usual rounded sinker, which rolls on the bottom of the body of water. It will also be seen that because of the location of the eyes 11, the sinker will slide on the inclined edge 7 with the result that the sinker will be directed upwardly over obstructions on the bottom of the body of water, eliminating snagging of the line, and providing a sinker which may be easily controlled.

The reference character 14 indicates a snap fastener for use in attaching a fish hook to the sinker. The snap fastener is attached to one of the eyes 11 by the swivel 15. It might be further stated that because of the general construction of the sinker, the line will be maintained in a straight course in currents or slowly moving waters.

What is claimed is:

A fishing line sinker comprising a weight having an irregularly pentagonal configuration in side elevation and being substantially rectangular in cross section, said weight having a first longest side uppermost, said weight also having a second longest side extending downwardly and rearwardly, said body also having a third shorter rear side extending upwardly and rearwardly from a point adjacent the rear of the second side, the juncture of said second and third sides being generally rounded, said body having a fourth flat side between said first and second sides and a fifth flat side between said first and third side, and a one piece wire embedded in said body, said wire comprising an elongated straight bar disposed parallel with the first mentioned longest side, said bar extending beyond the ends of said body and formed exteriorly of said body into front and rear eyes, and a pair of short bars extending from said eyes into said body, said short bars each having an outer portion parallel with said straight bar, and an inner portion diverging from said straight bar and firmly embedded in said body, the inner portion of the short bar adjacent the second longest side being of greater length than the inner portion of the bar adjacent the third shorter rear side, and the inner portion of each bar being longer than its associated outer portion.

References Cited in the file of this patent

UNITED STATES PATENTS

| | | |
|---|---|---|
| 702,955 | Johnson | June 24, 1902 |
| 2,036,954 | Murray | Apr. 7, 1936 |
| 2,069,972 | Schroeder | Feb. 9, 1937 |
| 2,597,792 | Hardy | May 20, 1952 |

FOREIGN PATENTS

| | | |
|---|---|---|
| 659,706 | MacDonald | 1951 |